US008072499B2

(12) United States Patent
Nagata (10) Patent No.: US 8,072,499 B2
(45) Date of Patent: Dec. 6, 2011

(54) IMAGE CAPTURE DEVICE AND METHOD (75) Inventor: Masaharu Nagata, Tokyo (JP)

(73) Assignee: Sony Corporation, Tokyo (JP)

( * ) Notice: Subject to any disclaimer, the term of this patent is extended or adjusted under 35 U.S.C. 154(b) by 745 days.

(21) Appl. No.: 11/532,927

(22) Filed: Sep. 19, 2006

(65) Prior Publication Data
US 2007/0064977 A1   Mar. 22, 2007

(30) Foreign Application Priority Data
Sep. 20, 2005 (JP) ................ P2005-272399

(51) Int. Cl.
H04N 5/228 (2006.01)
H04N 5/225 (2006.01)
H04N 5/232 (2006.01)
H04N 9/47 (2006.01)

(52) U.S. Cl. ............. 348/208.6; 348/169; 348/352; 348/142

(58) Field of Classification Search .......... 348/208.6, 348/148, 169, 352, 142
See application file for complete search history.

(56) References Cited

U.S. PATENT DOCUMENTS

| 5,034,986 A * | 7/1991 | Karmann et al. ........ 382/103 |
| 5,103,305 A * | 4/1992 | Watanabe ............... 382/236 |
| 5,631,697 A * | 5/1997 | Nishimura et al. ........ 348/172 |
| 5,654,772 A * | 8/1997 | Mester et al. ............ 348/700 |
| 5,666,157 A * | 9/1997 | Aviv .................... 348/152 |
| 5,712,474 A * | 1/1998 | Naneda ................. 250/208.1 |
| 5,872,604 A * | 2/1999 | Ogura ................... 348/699 |
| 6,069,918 A * | 5/2000 | Meyer et al. ............ 375/240.17 |
| 6,539,177 B2 * | 3/2003 | Parulski ................ 396/287 |
| 6,636,257 B1 * | 10/2003 | Harada et al. ........... 348/148 |
| 7,173,650 B2 * | 2/2007 | Cohen-Solal et al. ...... 348/172 |
| 7,555,141 B2 * | 6/2009 | Mori .................... 382/103 |
| 2003/0103149 A1 * | 6/2003 | Kinjo et al. ............ 348/231.5 |
| 2005/0062886 A1 * | 3/2005 | Hoshino et al. .......... 348/459 |
| 2005/0195383 A1 * | 9/2005 | Breed et al. ............ 356/4.01 |
| 2005/0226333 A1 * | 10/2005 | Suzuki et al. ........... 375/240.16 |
| 2005/0270380 A1 * | 12/2005 | Tomita et al. ........... 348/208.99 |
| 2005/0271252 A1 * | 12/2005 | Yamada ................. 382/103 |

FOREIGN PATENT DOCUMENTS

| JP | 06-339056 | 12/1994 |
| JP | 10-191149 | 7/1998 |
| JP | 2000-099696 | 4/2000 |
| JP | 2002-314851 | 10/2002 |
| JP | 2003-036427 | 2/2003 |
| JP | 2003-244479 | * 8/2003 |
| JP | 2004-157979 | 6/2004 |
| JP | 2004-248249 | 9/2004 |

OTHER PUBLICATIONS

Japanese Office Action issued on Dec. 7, 2010 in connection with counterpart JP Application No. 2005-272399.

* cited by examiner

Primary Examiner — David Ometz
Assistant Examiner — Quang Le
(74) Attorney, Agent, or Firm — SNR Denton US LLP (57) ABSTRACT An image capture device, including: a motion vector detection unit that detects a motion vector of a plurality of successive images; a determination unit that determines whether the motion vector detected by the motion vector detection unit is of a predetermined amount or more in a fixed direction; and a warning unit that issues a warning when the determination unit determines that the motion vector is of the predetermined amount or more in the fixed direction.

7 Claims, 12 Drawing Sheets

IMAGE CAPTURE DEVICE AND METHOD

CROSS REFERENCES TO RELATED APPLICATIONS

The present invention contains subject matter related to Japanese Patent Application JP 2005-272399 filed in the Japanese Patent Office on Sep. 20, 2005, the entire contents of which being incorporated herein by reference.

BACKGROUND OF THE INVENTION

1. Field of the Invention

The present invention relates to an image capture device and method that are capable of detecting a motion vector from any captured image.

2. Description of the Related Art

The previous types of cameras have drawbacks of not being able to capture the image of an object, e.g., person, as is originally intended, and in the resulting image, the object may be off the frame or may not be correctly at the center. This is caused by the camera body failing to remain still at the moment when a shutter button is clicked due to fatigue of the hands of a person in charge of image capture (hereinafter, referred to as user), improper environment where he or she stands, or others. For the aim of overcoming such drawbacks, Patent Document 1 (JP-A-2005-20196) describes an image capture device in which a potential object is extracted from an image result to determine whether or not the image result is satisfactory based on the size or positioning of the potential object in the image result, for example. In this manner, the image capture is prevented from ending in failure.

Such a method of Patent Document 1 is indeed effective for a system that can spend a long processing time such as digital still camera. However, for a system that performs processing within a predetermined timeframe, e.g., video camera, the processing is complicated and thus the method is difficult for implementation. Moreover, with the video camera, it is generally difficult to capture the same scene again even if the scene capture is ended in failure. The technology described in Patent Document 1 is not thus applicable.

Patent Document 2 (JP-A-2004-112550), Patent Document 3 (JP-A-7-30795) and Patent Document 4 (JP-A-5-61092) each describe a technology of preventing an object from going out of the frame also with video cameras, for example.

Specifically, Patent Document 2 (JP-A-2004-112550) describes an image capture device provided with warning means, which designates and traces a correct object region on a screen, and when determining that the object is off from the screen, issues a warning.

Patent Document 3 (JP-A-7-30795) describes a video camera system provided with tracking means, which detects whether or not an object is fitting in a display screen, and when determining that the object is "not existent", starts automatic tracking to capture the object.

Patent Document 4 (JP-A-5-61092) describes a camera shake prevention device that automatically tracks a main object, and when determining that the main object is put beyond an image-capture frame, makes a notification.

SUMMARY OF THE INVENTION

With the technologies described in Patent Documents 2 to 4, an object is traced to determine whether or not the object is fitting in the display screen. With this being the case, if the camera is not directed at all toward the direction of the object due to misoperation or others, no object tracing is started, and no determination can be made in the manner as described above. The Patent Document 3 describes about the mode of tracking the object when the object is out of the display frame. This is considered a drawback of being not efficient because after completely losing track the object, a scanning operation is started again for the area around the object by panning and tilting operations.

In the technologies of Patent Documents 3 and 4, if the object goes out of the frame, the user is notified so by a lamp or an LED (Light-Emitting Diode). This is also considered a drawback of causing adverse effect to image capture by the light of the lamp or LED.

It is thus desirable to provide, according to one embodiment of the present invention, an image capture device that includes: motion vector detection means for detecting a motion vector of a plurality of successive images; determination means for determining whether the motion vector detected by the motion vector detection means is of a predetermined amount or more in a fixed direction; and warning means for issuing a warning when the determination means determines that the motion vector is of the predetermined amount or more in the fixed direction.

Preferably, the motion vector detection means detects the motion vector for all of the images.

Preferably, the warning means issues the warning at least by one means of light, sound, and vibration.

Preferably, the image capture device includes: display means for displaying the successive images in a sequential manner; and region designation means capable of designating a specific region of any of the images displayed on the display means. The motion vector detection means detects the motion vector of only the specific region designated by the region designation means.

Still preferably, the image capture device further includes imaging means for imaging a first image of the successive images. When the specific region is not included in the first image captured by the imaging means, the determination means determines a movement amount of the specific region with respect to the image based on the motion vector detected by the motion vector detection means for a second image immediately before the first image. Based on the determination result of the determination means, the display means displays a display element indicating a direction and an amount that the specific region is moved from the second image.

Preferably, the warning means performs wireless communications with the image capture device.

Preferably, the warning means has a setting not to issue the warning irrespective of the determination result of the determination means.

Preferably, the imaging device further includes a camera shake correction section that finds, from the motion vectors detected by the motion vector detection means for all of the images, first and second motion vectors being the first and second largest, determines the second motion vector as a motion caused by camera shake, and applies a camera shake correction based on the successive images and the second motion vector corresponding thereto.

It is also desirable to provide, according to another embodiment of the invention, an image capture device that includes: imaging means for imaging a plurality of successive images; motion detection means for detecting a motion of the imaging means; determination means for determining, based on the motion of the imaging means detected by the motion detection means, whether or not the imaging means is moved by a predetermined amount; and warning means for issuing a warning when the determination means determines that the imaging means is moved by the predetermined amount.

Preferably, the motion detection means detects the motion of the imaging means by an angular velocity sensor.

Preferably, the warning means has a setting not to issue the warning irrespective of a determination result of the determination means.

It is also desirable to provide, according to a further embodiment of the invention, an image capture method that includes: a first step of detecting a motion vector of a plurality of successive images; a second step of determining whether the motion vector detected in the first step is of a predetermined amount or more in a fixed direction; and a third step of issuing a warning when the motion vector is determined in the second step as being of the predetermined amount or more in the fixed direction.

It is also desirable to provide, according to a furthermore embodiment of the invention, an image capture method that includes: a first step of detecting the motion of the imaging means for imaging a plurality of successive images; a second step of determining, based on the motion of the imaging means in its entirety detected in the first step, whether or not the imaging means is moved in its entirety by a predetermined amount; and a third step of issuing a warning when the imaging means is determined in the second step as being moved by the predetermined amount.

According to the image capture device of the embodiments of the invention, a motion vector detected for every captured image is utilized to detect the motion of the image capture device so that a determination is made whether the object is about to be off the display frame or not. As such, a user can be notified in advance of a possibility of the object going out of the display frame.

Even if the camera is moved abruptly due to misoperation or others and the object thus goes out of a display frame, detecting a motion vector from a precedingly-captured image enables to estimate the direction where the object is moved from the display frame. As such, the user can know which direction he or she is supposed to direct the image capture device to have a good chance of finding the object, and putting the object back to the frame.

BRIEF DESCRIPTION OF THE DRAWINGS

FIG. 8 is a flowchart of an exemplary operation to be executed by the image capture device 1a;

DETAILED DESCRIPTION OF THE INVENTION

First Embodiment

An image capture device of a first embodiment detects a motion vector from any captured image, and based on the motion vector, determines whether an object will be off the frame or not. When determining that the object will be off the frame, the image capture device issues a warning.

Figure 1:
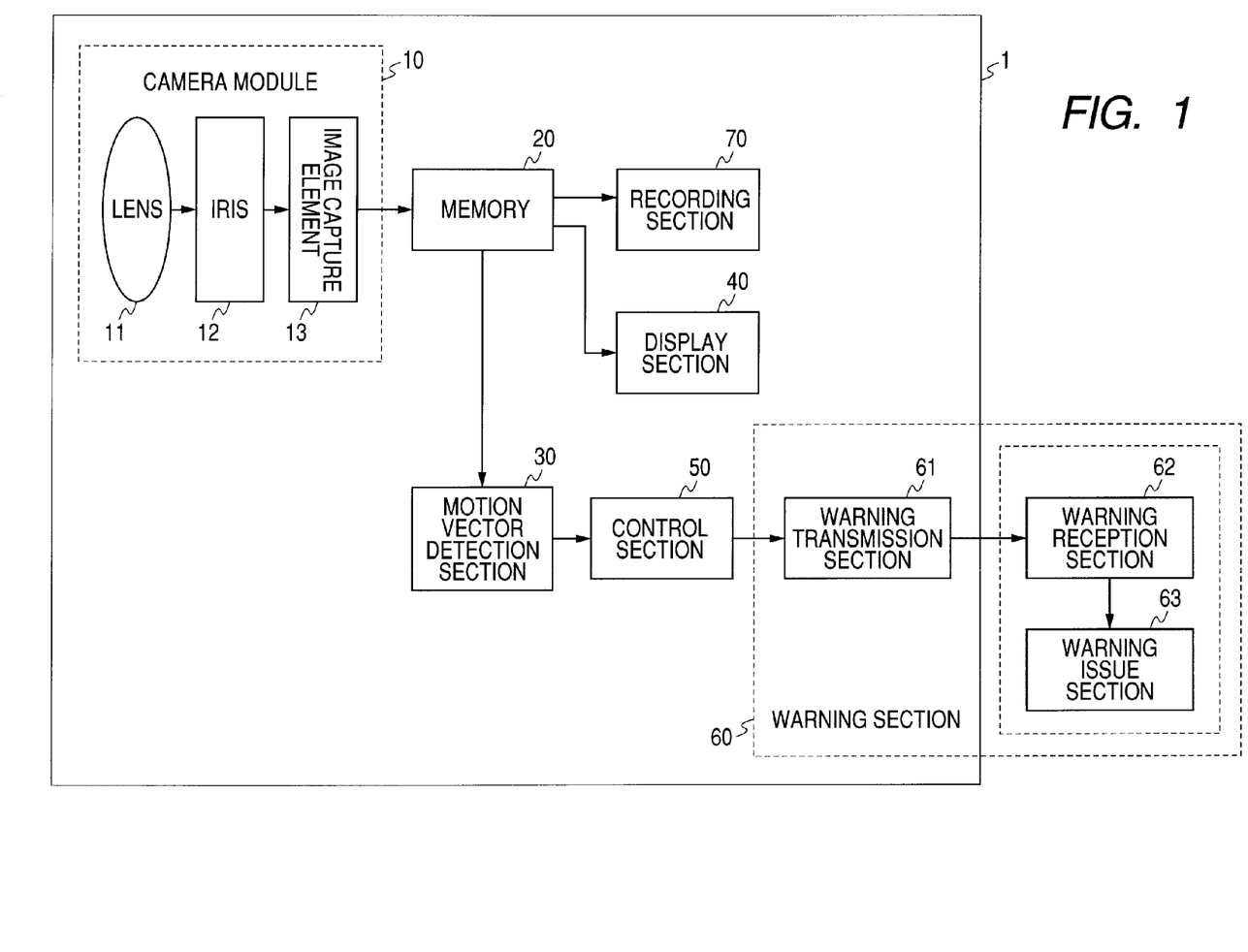
FIG. 1 is a block diagram of an image capture device 1 of a first embodiment.

FIG. 1 is a block diagram of such an image capture device 1 of the first embodiment.

As shown in FIG. 1, the image capture device 1 is configured to include a camera module 10, a memory 20, a motion vector detection section 30, a display section 40, a control section 50, a warning section 60, and a recording section 70.

As shown in FIG. 1, the camera module 10 includes a lens 11, an iris 12 for iris adjustment, and an image capture element 13 exemplified by a CCD (Charged Coupled Device) or a CMOS (Complementary Metal Oxide Semiconductor), or others. The image capture element 13 applies optoelectronic conversion to a light passing through the lens 11, and outputs the result as image data. Note here that the iris 12 is not necessarily provided, and if not provided, exposure control is performed only by an electronic shutter function of the image capture element 13.

The memory 20 stores therein a plurality of image data provided by the camera module 10. The image data is varied in image capture time. For example, the image data stored in the memory 20 is of N pieces of images captured at every $\frac{1}{30}$ seconds, for example.

The movement vector detector 30 detects a motion vector for each of the N image data stored in the memory 20.

The motion vector detection section 30 performs motion vector detection by any well-known method, e.g., background difference, interframe difference, and optical flow.

With background difference, an image of background in which there is no chance for the object to exist is prepared in advance, and a difference is taken between an input image and the background image.

With interframe difference, for any successive frames, a difference is taken for their corresponding pixels, and any region showing a large difference is detected as including a moving object.

With optical flow, an optical flow (motion vector) is detected for every pixel in the screen. For estimation of such an optical flow, a gradient method and a block matching method will be used.

With the gradient method, a motion parameter is calculated for an object from an image by space-time differentiation. With block matching, an image is segmented into small regions, i.e., blocks, of a fixed size, and which of the preceding frames the blocks each corresponds to the preceding frames is found. A difference of position for the corresponding block is regarded as a motion vector.

The motion vector detection section 30 in the embodiment of the invention may detect a motion vector with any of the methods. As an example, a motion vector is detected for images by finding optical flow with block matching.

Figures 2A, 2B, 2C:
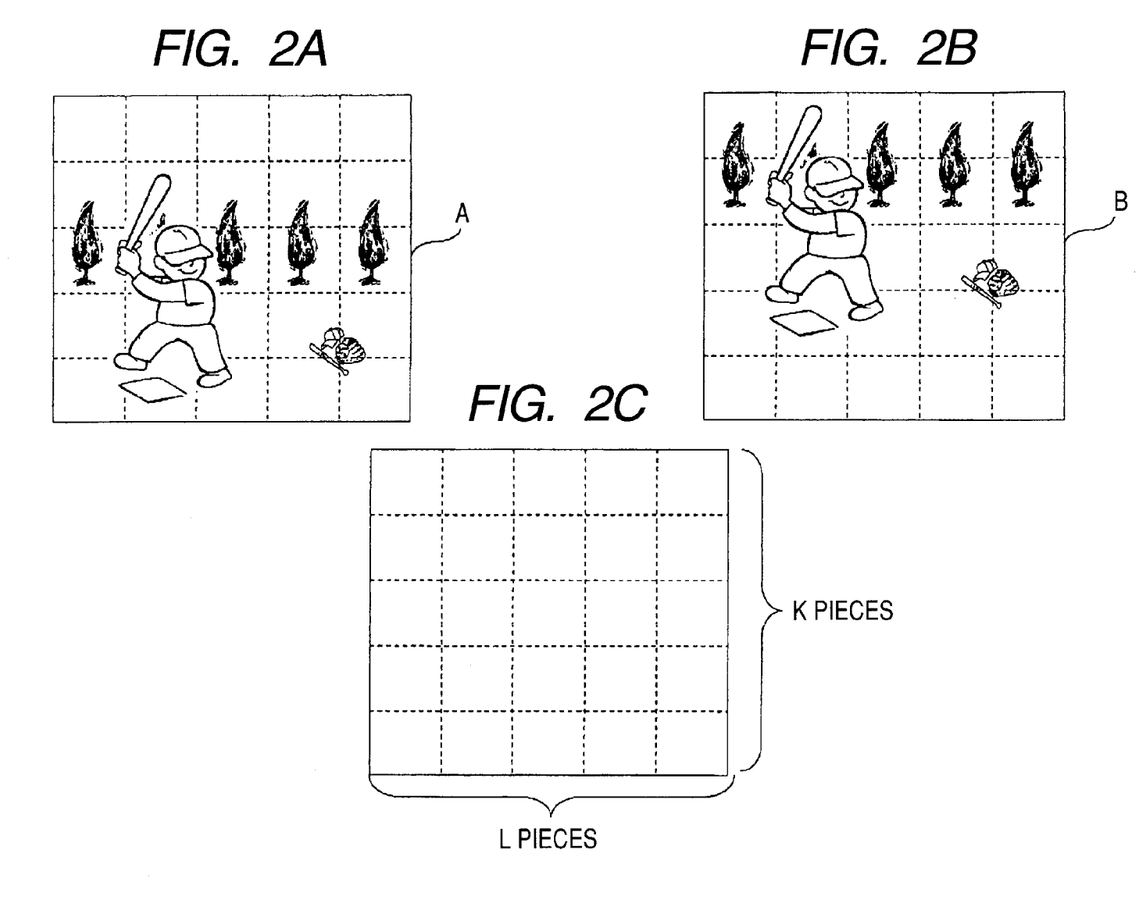
FIG. 2A is a diagram showing an image A that is an exemplary image stored in a memory 20.
FIG. 2B is a diagram showing an image B that is captured after the image A.
FIG. 2C is a diagram showing exemplary block segment performed by a motion vector detection section 30 with respect to the images A and B.

For brevity, the memory 20 is assumed to store therein 2 pieces of images. FIG. 2A shows the first image A, and FIG. 2B shows the second image B. The images A and B are those captured by the camera module 10 with an interval of 1/30 seconds, for example, and the image A is captured before the image B.

As shown in FIG. 2C, the motion vector detection section 30 segments each of the images into K×L blocks, i.e., K in the vertical direction and L in the lateral direction, and applies block matching on a block basis. Note here that K and L are both an arbitrary integer of 1 or larger.

Block matching is performed generally by using colors or brightness of pixels in the block, for example. Exemplified here is a case of using only the brightness.

Figure 3:
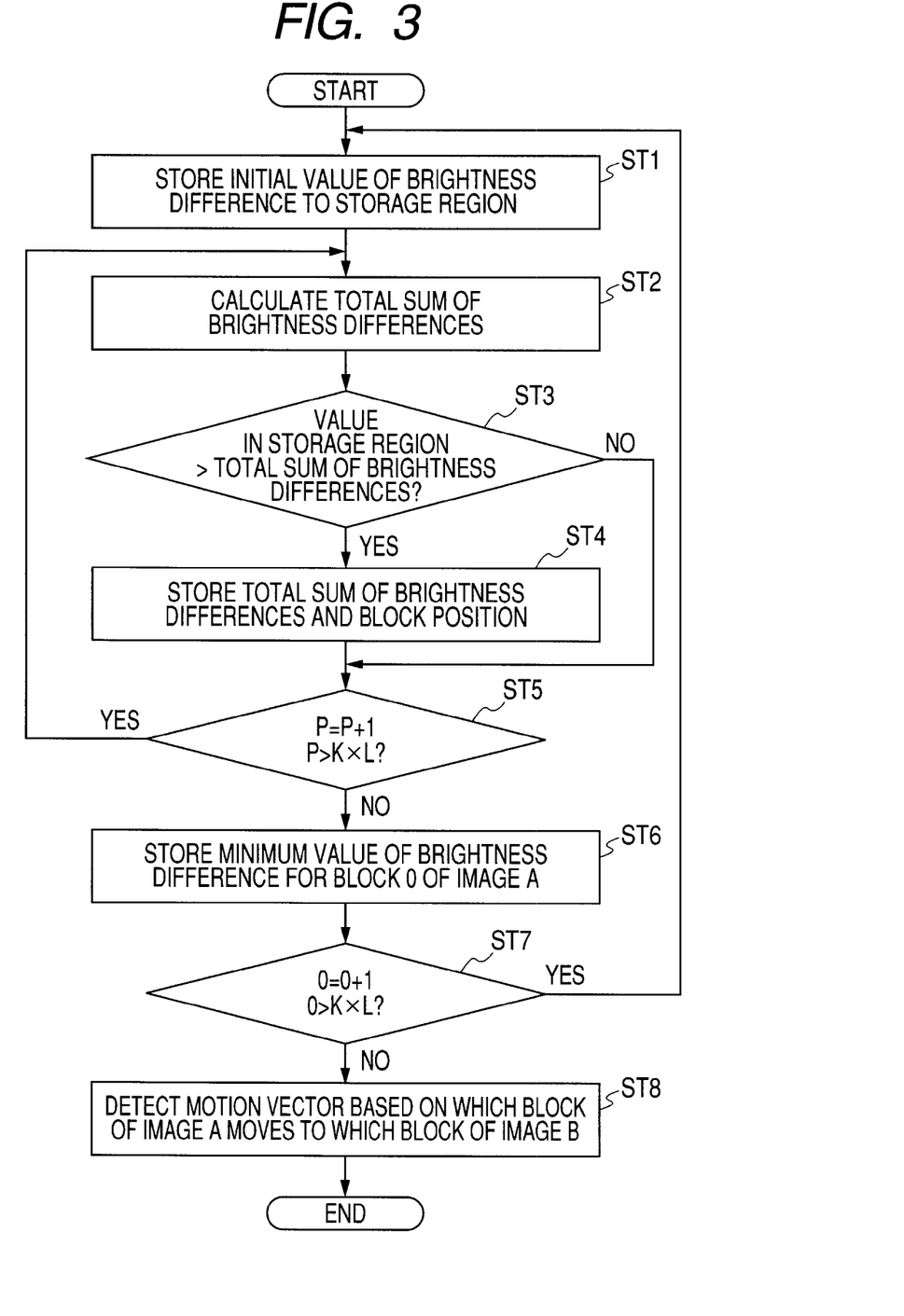
FIG. 3 is a flowchart for illustrating block matching to be performed by the motion vector detection section 30.

FIG. 3 is a flowchart for illustrating block matching to be performed by the motion vector detection section 30.

Step ST1:

The motion vector detection section 30 initializes a storage region of the motion vector detection section 30. This storage region is used to store therein a brightness difference for use in step ST3, and a maximum value of the brightness difference is previously given so that the storage region is initialized. Here, the maximum value of the brightness difference is derived by first finding the total sum of the brightness values for every pixel in each of the blocks, and then multiplying thus calculated total sum by 2. The maximum value of the brightness difference is the resulting value or larger, and is referred to as brightness difference initialization value.

Step ST2:

The motion vector detection section 30 takes a brightness difference between a specific pixel in the Oth block of the image A and its corresponding pixel in the Pth block of the image B, and finds the total sum of brightness difference absolute values of every pixel. Herein, O and P are each an integer in a range from 1 to K×L.

Step ST3:

If the total sum of the brightness difference absolute values found by the motion vector detection section 30 in step ST2 is smaller than the value stored in the storage region, the procedure goes to step ST4, and if not smaller, the procedure goes to step ST5.

Step ST4:

The motion vector detection section 30 overwrites the storage region, for storage, with information about a block number of the image A (Oth in this example) and a block number of the image B (Pth block) which are used to find the total sum of the brightness difference absolute values in step ST2.

Step ST5:

The motion vector detection section 30 adds 1 to the value P that indicates a block number of the image B. If P<K×L is satisfied, the procedure returns to ST2, and if P=K×L is satisfied, the procedure goes to step ST6.

Step ST6:

The storage region of the motion vector detection section 30 stores therein a minimum value of the total sum of the brightness difference absolute values for every block in the image B with respect to a specific block (Oth block in this example) of the image A. Based on this value, the motion vector detection section 30 calculates the block position in the image B corresponding to a specific block of the image A.

Step ST7:

The motion vector detection section 30 adds 1 to the value O that indicates a block number of the image A. If O<K×L is satisfied, the procedure returns to ST1, and if O=K×L is satisfied, the procedure goes to step ST8.

Step ST8:

The storage region of the motion vector detection section 30 stores therein a minimum value of the total sum of the brightness difference absolute values for the blocks in the image B corresponding to each of the blocks of the image A. Based on this value, the motion vector detection section 30 calculates the movement of the blocks of the image A, i.e., which block of the image B each block of the image A moves is calculated.

As such, the motion vector detection section 30 detects a motion vector.

The display section 40 is configured by an LCD (Liquid Crystal Display) or others, and displays thereon images captured by the camera module 10.

Based on the motion vector detected by the motion vector detection section 30, the control section 50 determines whether or not to warn a user of a possibility that the object may be off the frame.

By referring to the flowchart of FIG. 4, such a determination about the frame-off possibility will be described later.

The warning section 60 is configured to include a warning transmission section 61, a warning reception section 62, and a warning issue section 63. The warning transmission section 61 transmits a warning signal in accordance with the determination made by the control section 50, and the warning reception section 62 receives the warning signal. Based on the warning signal, the warning issue section 63 issues a warning to the user by means of light, sound, vibration, or others.

The warning issue section 63 can be set not to issue a warning through the user's operation. This is because when the user has some intention to operate the image capture device 1 to pan, tilt, and zoom, it is prevented that with such operations, the control section 50 may determine that there is a frame-off possibility, and thus the warning transmission section may erroneously issue a warning signal.

Described below is a determination criterion of the control section 50.

Figure 4:
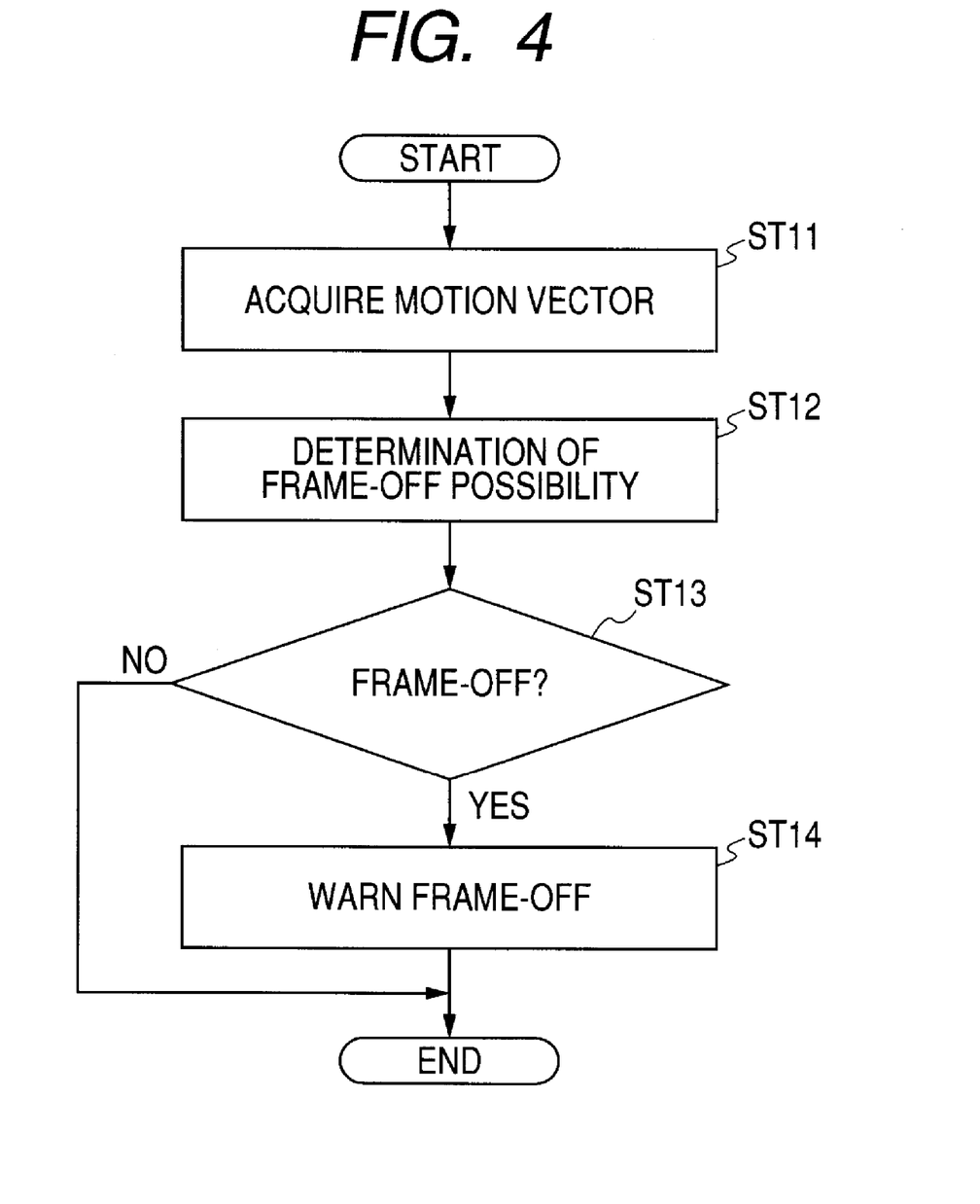
FIG. 4 is a flowchart for illustrating a determination criterion of a control section 50.

FIG. 4 is a flowchart for illustrating the determination criterion of the control section 50.

Step ST11:

From the motion vector detection section 30, the control section 50 acquires K×L pieces of motion vectors, i.e., a motion vector for every block of the latest image data.

Step ST12:

Using the K×L pieces of motion vectors acquired in step ST11, the control section 50 determines a frame-out possibility for the object.

The frame-out possibility for the object is determined in the following manner, for example.

For example, the control section 50 calculates distribution of the K×L pieces of motion vectors. If there are many blocks showing the predetermined amount of movement in a specific fixed direction, the control section 50 determines that the angle of view of the camera is changed with some reasons, e.g., camera shake, and thus determines that there is a frame-out possibility for the object.

Note here that even if the some blocks shows the predetermined amount or more of movement, the movement is merely for a part of the entire image. With this being the case, no determination is made that there is a frame-out possibility.

Step ST13:

In step ST12, when the control section 50 determines that there is a frame-out possibility, the procedure goes to step ST14, and when not, the procedure goes to step ST15.

Step ST14:

Based on the determination made by the control section 50 in step ST12, the warning section 60 issues a warning.

In this embodiment, as shown in FIG. 1, the warning transmission section 61 is provided inside of the image capture device 1, but the warning reception section 62 and the warning issue section 63 are both provided outside of the image capture device 1 for wireless communications by infrared radiation, for example. This is because the warning, e.g., light, sound, or vibration, by the warning issue section 63 may affect the camera module 10 and may cause problems for image capture. The reason why not to display a warning on the display section 40 or others is that the image capture device 1 of this embodiment is aimed to warn frame-off of an object or others as a result of the user's momentary lapses of attention, for example. There thus is a possibility that the user may not notice the warning because he or she is not looking at the display section, for example. Specifically, the warning section 63 warns the user by sound using an earphone separately provided from the image capture device 1, or by vibration using a vibrator.

The recording section 70 records, sequentially, the images stored in the memory 20 to recording media, e.g., video tapes, HDDs (Hard Disk Drives), or optical disks.

Described next is an exemplary operation of the image capture device 1.

Figure 5:
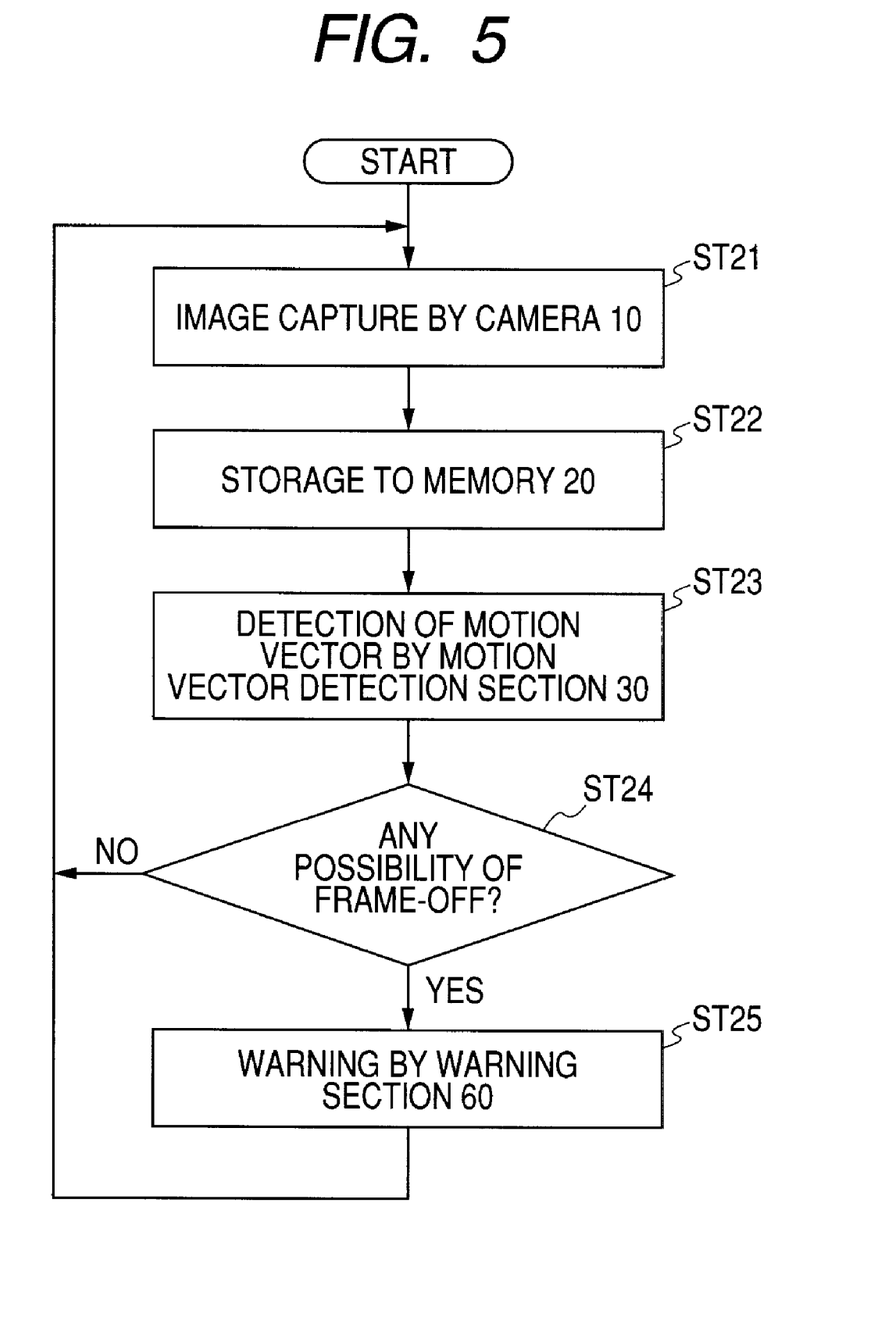
FIG. 5 is a flowchart of an exemplary operation to be executed by the image capture device 1.

FIG. 5 is a flowchart showing an exemplary operation of the image capture device 1.

Step ST21:

The camera module 10 captures the image of an object.

Step ST22:

The image data of the image captured in step ST21 by the camera module 10 is stored in the memory 20.

Step ST23:

The motion vector detection section 30 detects a motion vector based on the image data stored in the memory 20 in step ST22.

Step ST24:

Based on the motion vector detected by the motion vector detection section 30 in step ST23, the control section 50 determines whether there is a frame-out possibility or not. With a determination result of Yes, the procedure goes to step ST25, and with No, the procedure returns to step ST21.

Step ST25:

The warning section 60 warns the user about the determination result derived by the control section 50 in step ST24, and the procedure returns to step ST21.

As described in the foregoing, according to the image capture device 1 of the first embodiment, a motion vector is detected from any captured image, and based on the motion vector, a determination is made about a frame-off possibility so that a warning is issued to the user. Accordingly, the object is prevented from going out of the frame due to camera shake or misoperation, for example.

Exemplified in the embodiment is the case of detecting a motion vector by block matching. Alternatively, the motion vector may be detected by background difference, interframe difference, or gradient.

In this embodiment, communications with the warning reception section 62 and the warning issue section 63 in the warning section 60 is performed wirelessly by infrared radiation or others. This is surely not restrictive, and if certain criteria are met that the warning by vibration or others to be issued by the warning issue section 63 does not affect the image capture device 1 for image capture, the communications may be performed over a cable.

Also in the embodiment, the warning reception section 62 and the warning issue section 63 in the warning section 60 are provided outside of the image capture device 1. If certain criteria are met that the warning to be issued by the warning issue section 63 does not affect the image capture, the warning section 60 may be entirely provided inside of the image capture device 1. With this being the case, the warning transmission section 61 and the warning reception section 62 are not necessarily provided.

Also in the embodiment, the warning issue section 63 is allowed to be set not to issue a warning. Alternatively, any other component may beset not to issue a warning. For example, the warning transmission section 61 may be set not to transmit a warning signal, the warning reception section 62 may be set not to receive a warning signal, or the control section 50 may be set not to make a determination about a frame-out possibility.

Also in this embodiment, based on a motion vector detected by the motion vector detection section 30, a motion vector showing the largest movement in the blocks is used for a determination about a frame-out possibility. Alternatively, a camera shake correction section further may be provided, in which a vector showing the second largest movement may be detected, the vector is determined as being the movement by camera shake, and based on the motion vector showing the second largest movement, the image is subjected to camera shake correction.

Second Embodiment

An image capture device of a second embodiment detects, when the image of a moving object is captured, a motion vector of a specific part of the image, i.e., region of the moving object is detected. Based on the motion vector, the image capture device determines whether there is a frame-out possibility for the object or not. If the determination result is Yes, a warning is accordingly issued.

Figure 6:
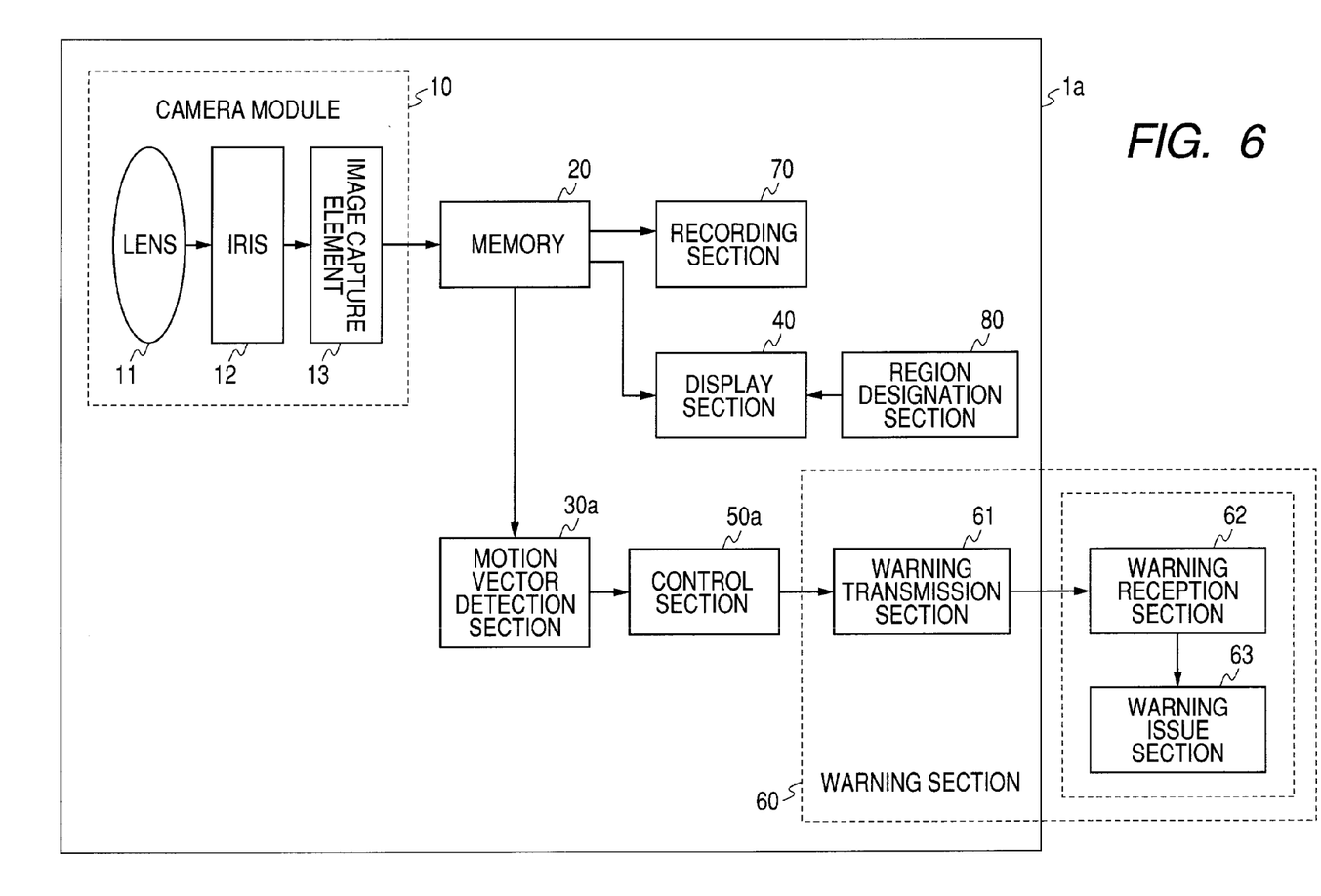
FIG. 6 is a block diagram of an image capture device 1a of a second embodiment.

FIG. 6 is a block diagram of such an image capture device 1a of the second embodiment.

As shown in FIG. 6, the image capture device 1a of this embodiment has the same configuration as that of the image capture device 1 of the first embodiment, except a motion vector detection section 30a, a control section 50a, and a region designation section 80. Any component sharing the same reference numeral as that of the first embodiment operates similarly thereto.

Described below are processes to be executed by the image capture device 1a of this embodiment.

The region designation section 80 is a component for the user to select a part of the image displayed on the display section 40 using a touch panel or others.

Figure 7A:
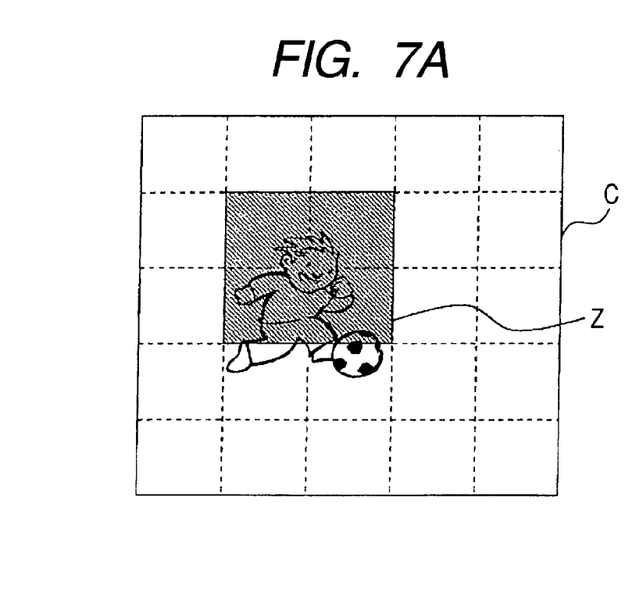
FIGS. 7A and 7B are both a diagram showing exemplary region selection in a case where an object of image capture is moving.

The image displayed on the display section 40 is segmented in advance, e.g., into K×L pieces, and the user selects a region including a moving object, i.e., a region Z in an image C of FIG. 7A.

As shown in FIG. 7A, the motion vector detection section 30a applies a motion vector detection process only to the region Z of the image C selected by the user's input via the region designation section 80.

Figure 7B:
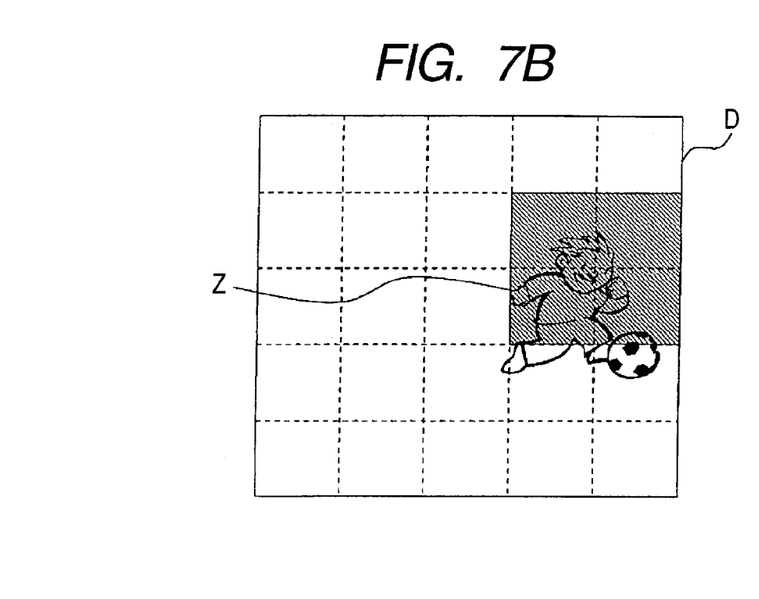

For motion vector detection, block matching may be applied as is described in the first embodiment based on the image C and an image D subsequent thereto shown in FIG. 7B, or any other method described in the first embodiment may be used.

The control section 50a applies motion vector detection only to the user-designated region so that the designated region Z is traced. Based on the motion vector of the designated region Z, the control section 50a determines whether or not the designated region Z is about to go out of the frame. As an exemplary determination criterion for the control section 50a, when the designated region Z moves to the block at the end of the frame with the speed faster than a predetermined value, the control section 50a determines that the designated region Z is about to be off the frame.

In the below, described is an exemplary operation of the image capture device 1a of this embodiment.

Figure 8:
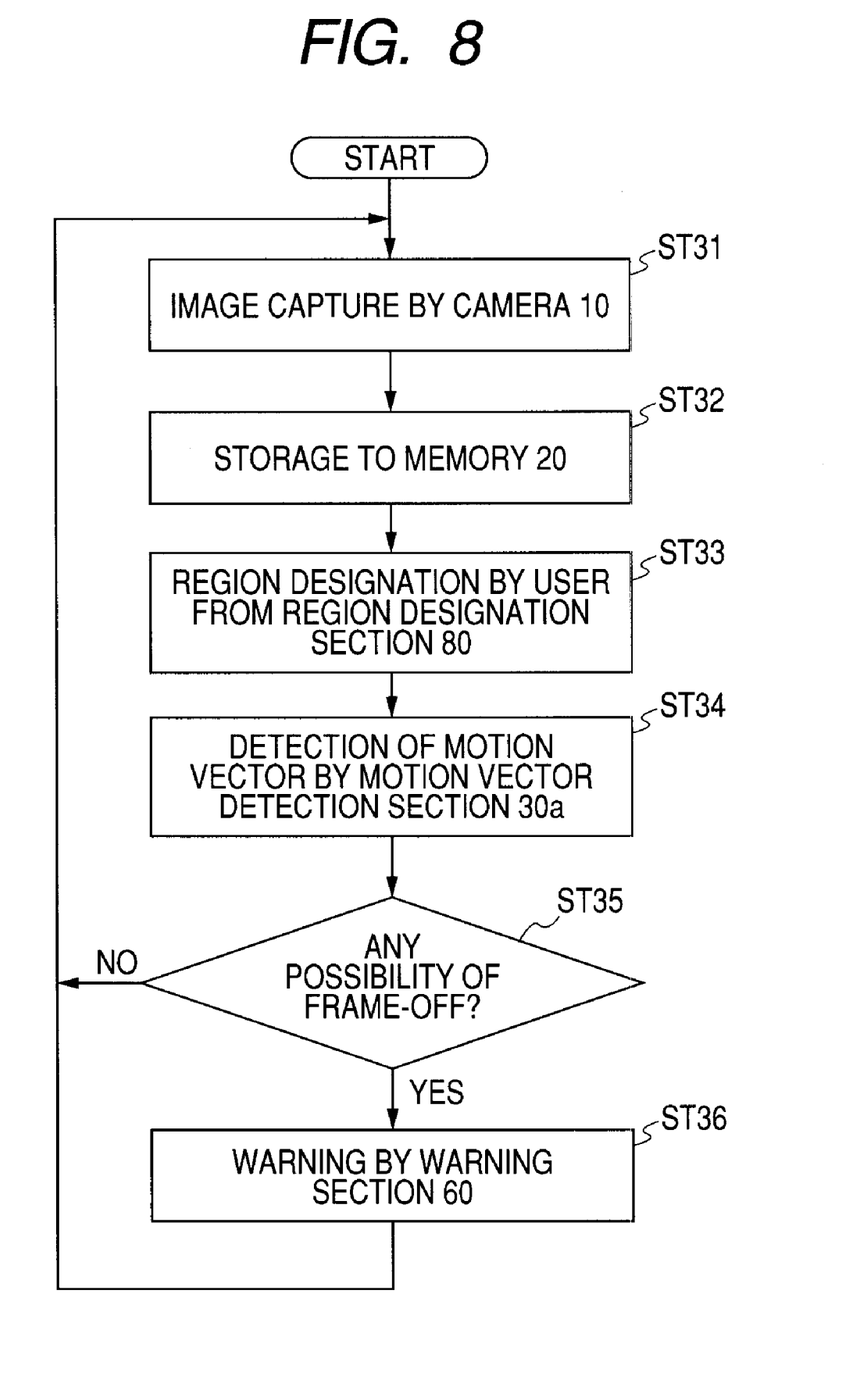

FIG. 8 is a flowchart showing an exemplary operation of the image capture device 1a.

Step ST31:
The camera module 10 captures the image of an object.

Step ST32:
The image data of the image captured in step ST31 by the camera module 10 is stored in the memory 20.

Step ST33:
From the image in the memory 20 stored in ST32, the user designates a region including a moving object via the region designation section 80.

Step ST34:
The motion vector detection section 30a detects a motion vector for the region designated in step ST33.

Step ST35.
Based on the motion vector detected by the motion vector detection section 30a in step ST34, the control section 50a determines whether there is any frame-out possibility or not. If the determination result is Yes, the procedure goes to step ST36, and if No, the procedure returns to step ST31.

Step ST36:
The warning section 60 warns the user about the determination result derived by the control section 50a in step ST35, and the procedure then returns to step ST31.

As described in the foregoing, according to the image capture device 1a of the second embodiment, a motion vector is detected from any captured image for a moving object, and based on the motion vector, a determination is made about a frame-off possibility so that a warning is issued to the user. This thus helps to track the rapidly-moving object for image capture.

Also in the embodiment, the warning reception section 62 and the warning issue section 63 in the warning section 60 are provided outside of the image capture device 1. If certain criteria are met that the warning to be issued by the warning issue section 63 does not affect the image capture, the warning section 60 may be entirely provided inside of the image capture device 1a. With this being the case, the warning transmission section 61 and the warning reception section 62 are not necessarily provided.

Third Embodiment

An image capture device of a third embodiment detects, when the image of a moving object is captured, a motion vector of a specific part of the image, i.e., region of the moving object, and when the object goes out of the frame, issues a command to the user for putting back the object into the frame.

Figure 9:
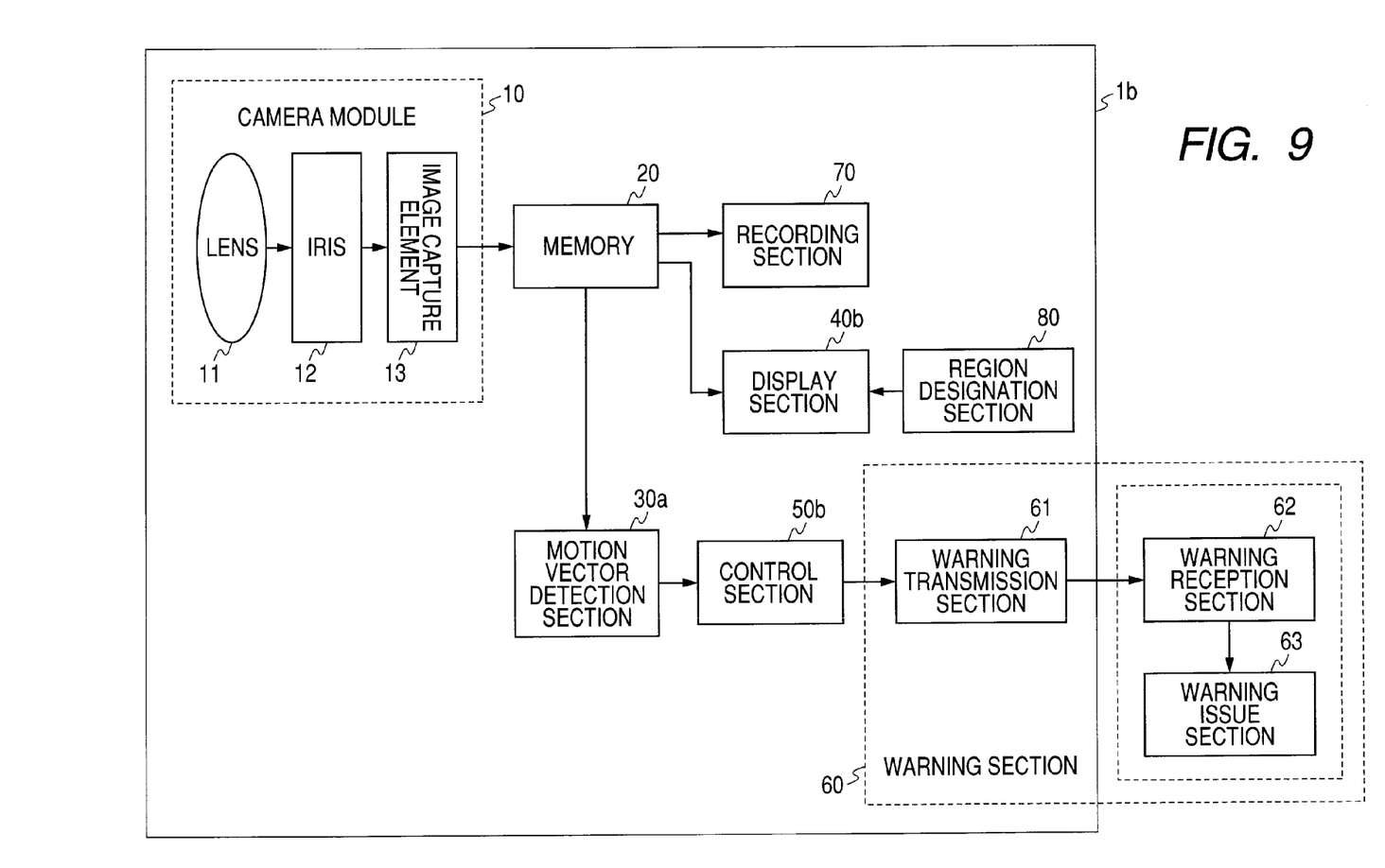
FIG. 9 is a block diagram of an image capture device 1b of a third embodiment.

FIG. 9 is a block diagram of such an image capture device 1b of the third embodiment.

As shown in FIG. 9, the image capture device 1b of this embodiment has the same configuration as that of the image capture device 1a of the second embodiment, except a display section 40b and a control section 50b. Any component sharing the same reference numeral as that of the image capture device 1a of the second embodiment operates similarly thereto.

When a user-specified region Z goes out of the frame of the camera module 10, the control section 50b estimates the movement direction and speed of the region Z based on the motion vector detected by the motion vector detection section 30a for the region Z.

Figure 10A:
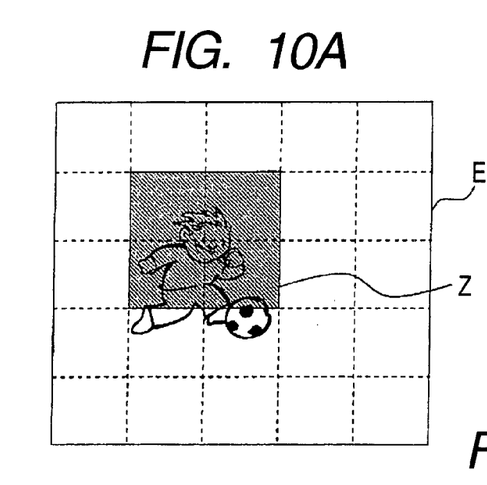
FIGS. 10A and 10B are both a diagram showing images E and F that are exemplary display images of a display section 40b before a moving object goes out of a frame of a camera module 10.
Figure 10B:
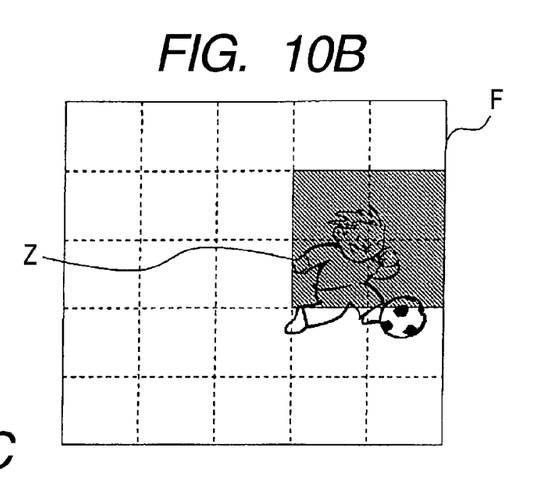
Figure 10C:
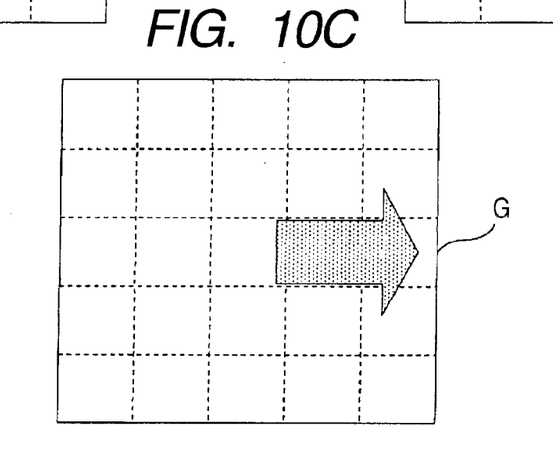
FIG. 10C is a diagram showing an exemplary command icon to be displayed on the display section 40b when the object goes out of the frame of the camera module 10 after moving from the image E to F.

Based on the movement direction and speed of the region Z estimated by the control section 50b, as shown in FIG. 10C, the display section 40b displays a command icon of an arrow or others on the image. This arrow or others indicate that if the user moves the image capture device 1b in the direction of the arrow, there is a high possibility that the object returns into the frame.

FIG. 10 is a diagram showing an exemplary display of the display section 40b.

Images E and F of FIGS. 10A and 10B each show an exemplary display image of the display section 40b before the moving object goes out of the frame of the camera module 10.

FIG. 10C shows an exemplary command icon to be displayed by the display section 40b when the object is off the frame of the camera module 10 because the object moved from the image E to F.

As the image G of FIG. 10C, the display section 40b uses an arrow showing the movement direction of the object, and thus shows the user the direction to move the image capture device 1b to put the object back to the frame. The user thus can momentarily understand which direction he or she is supposed to move the image capture device 1b to put back the object into the frame of the camera module 10 with a high possibility. If the arrow or others are changed in size, length, color, or others, the speed of the object can be displayed. This accordingly provides the user with information about how far the object is away from the frame end so that the user can know how much he or she is supposed to move the image capture device 1b based on the information.

As described above, according to the image capture device 1b of the third embodiment, a motion vector is detected from any captured image for a moving object, and when the object is off the frame, a command icon, e.g., arrow, is displayed on the display section 40b so that the object can be easily put back to the frame of the camera module 10. This thus helps users track the rapidly-moving object for image capture.

In the embodiment, the warning reception section 62 and the warning issue section 63 in the warning section 60 are provided outside of the image capture device 1s. If certain criteria are met that the warning to be issued by the warning issue section 63 does not affect the image capture, the warning section 60 may be entirely provided inside of the image capture device 1s. With this being the case, the warning transmission section 61 and the warning reception section 62 are not necessarily provided.

The command icon to be displayed by the display section 40b is not necessarily an arrow or others, and any may be used as long as the shape can indicate the direction and speed size by the orientation, length, color, or others.

Fourth Embodiment

An image capture device of a fourth embodiment uses an angular velocity sensor or others to detect its own movement, and determines whether or not the movement will bring an object off the frame. If determining that the object will be off the frame, the image capture device issues a warning.

Figure 11:
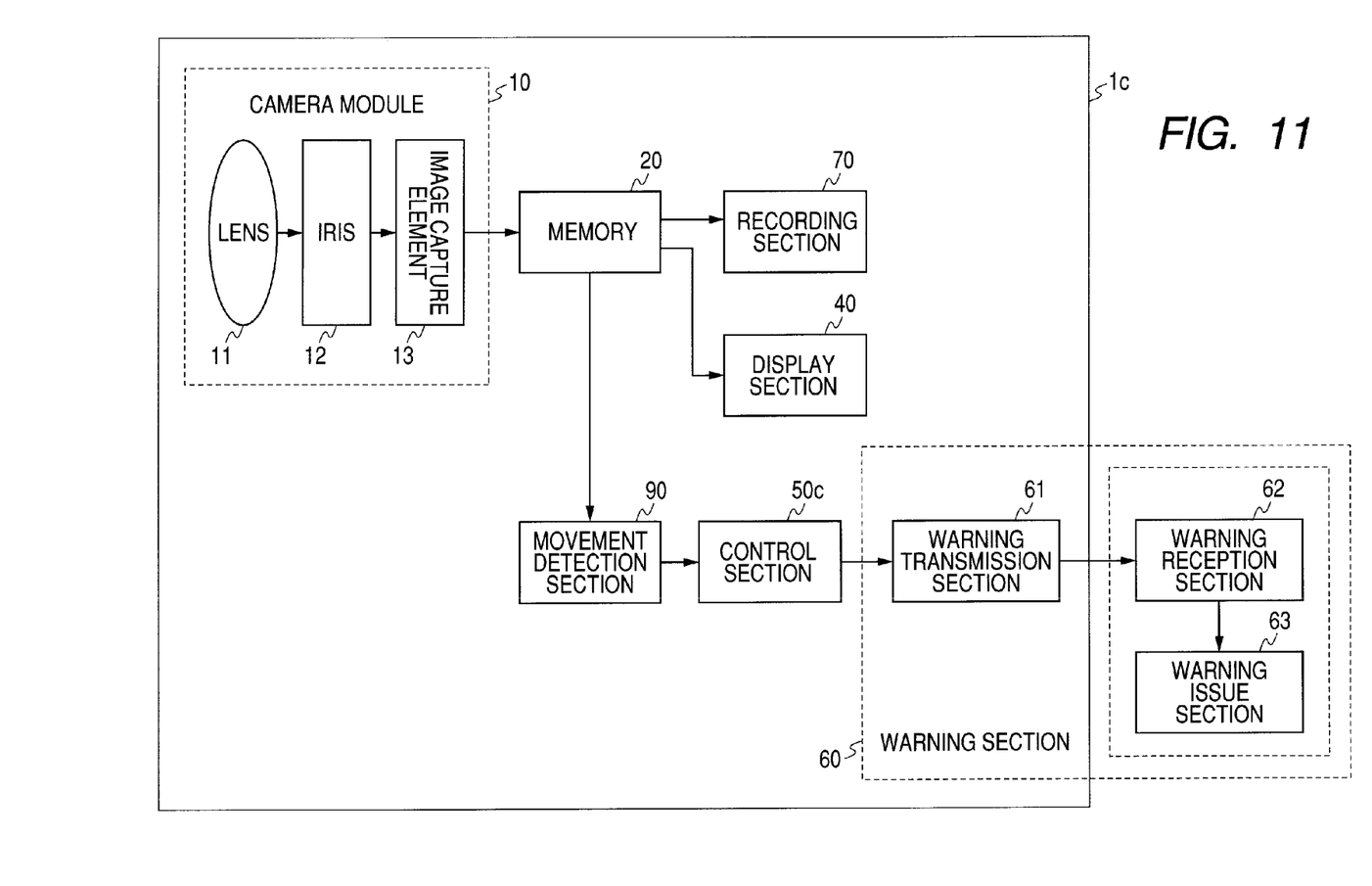
FIG. 11 is a block diagram of an image capture device 1c of a fourth embodiment.

FIG. 11 is a block diagram of such an image capture device 1c of the fourth embodiment.

As shown in FIG. 11, the image capture device 1c of this embodiment has the same configuration as that of the image capture device 1 of the first embodiment, except the motion vector detection section 30, a control section 50c and a motion detection section 90. Any component sharing the same reference numeral as that of the image capture device 1 of the first embodiment operates similarly thereto.

The motion detection section 90 detects an angular velocity of the entire image capture device 1c by an angular velocity sensor (gyrosensor).

Based on the angular velocity detected by the motion detection section 90, the control section 50c estimates the possibility that the image capture device 1c rotates by camera shake, misoperation, or others, and the object goes out of the frame of the camera module 10.

The control section 50c determines that there is a possibility of the object going out of the frame of the camera module 10 when the angular velocity detected by the motion detection section 90 is a predetermined value or larger.

In the below, described is an exemplary operation of the image capture device 1c of this embodiment.

Figure 12:
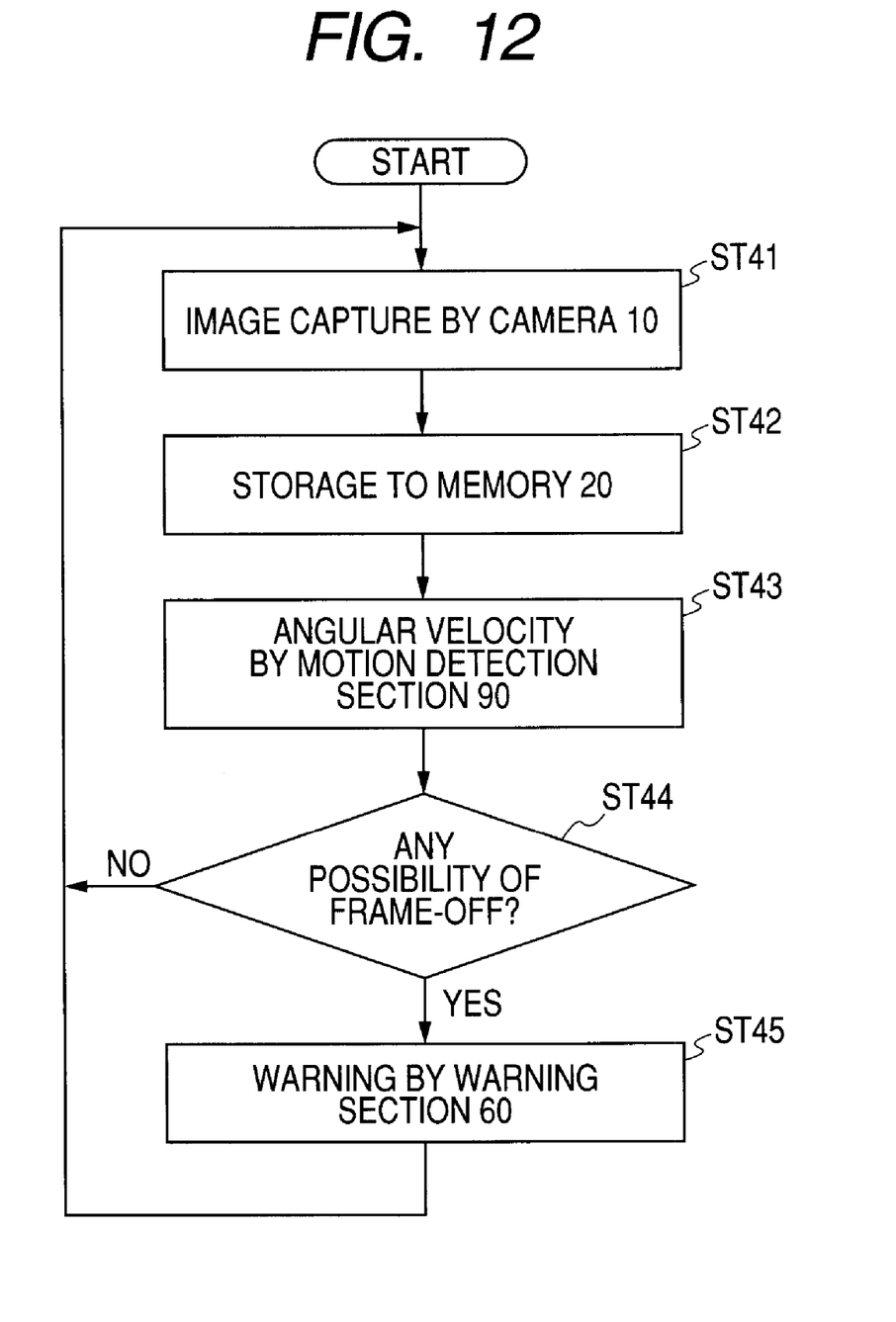
FIG. 12 is a flowchart of an exemplary operation to be executed by the image capture device 1c.

FIG. 12 is a flowchart of an exemplary operation of the image device 1c.

Step ST41:
The camera module 10 captures the image of an object.
Step ST42:
The image data of the image captured in step ST41 by the camera module 10 is stored in the memory 20.
Step ST43:
The motion detection section 90 detects an angular velocity of the image capture device 1c.
Step ST44:
Based on the angular velocity detected by the motion detection section 90 in step ST43, the control section 50c determines whether there is a frame-out possibility or not. When the determination result is Yes, the procedure goes to step ST45, and when the determination result is No, the procedure returns to step ST41.
Step ST45:
The warning section 60 warns the user about the determination result derived by the control section 50c in step ST44, and the procedure returns to step ST41.

As described above, according to the image capture device 1c of the fourth embodiment, the movement (tilt angle) of the image capture device 1c is detected by an angular velocity, and based thereon, the frame-out possibility is determined and then the user is warned. Accordingly, it is possible to prevent the object from being off the frame due to camera shake, misoperation, or others.

In the embodiment, the warning reception section 62 and the warning issue section 63 in the warning section 60 are provided outside of the image capture device 1. If certain criteria are met that the warning to be issued by the warning issue section 63 does not affect the image capture, the warning section 60 may be entirely included in the image capture device 1c. With this being the case, the warning transmission section 61 and the warning reception section 62 are not necessarily provided.

The invention is not restrictive to the above-described embodiments.

That is, it should be understood by those skilled in the art that various modifications, combinations, sub-combinations and alterations may occur depending on design requirements and other factors insofar as they are within the scope of the appended claims or the equivalents thereof.

What is claimed is:

1. An image capture device, comprising:
an image capture unit configured to capture a plurality of successive images within a frame;
a motion vector detection unit configured to detect a motion vector of a succession of images of an object within the captured plurality of successive images;
a control unit configured to determine whether a detected motion vector is of at least a predetermined magnitude in a fixed direction;
a warning unit configured to issue, during image capturing, a warning, to a user, when the detected motion vector is of at least the predetermined magnitude in the fixed direction, that a frame-out possibility exists and to indicate to the user in which direction to move the frame so as to prevent the frame-out from occurring;
a display for displaying the successive images in a sequential manner; and
a region designation section configured to designate a specific region of any of the images displayed on the display;
wherein
the motion vector detection unit detects the motion vector for only the specific region designated by the region designation section, when the specific region is not included in a first image captured by the image capture unit, the control unit determines a movement amount of the specific region with respect to the image based on the motion vector detected by the motion vector detection unit for a second image immediately before the first image; and
the device, based on said determined movement amount, displays a display element indicating a direction and an amount that the specific region is moved from the second image.

2. The image capture device according to claim 1, wherein the motion vector detection unit detects the motion vector for all of the images.

3. The image capture device according to claim 1, wherein the warning unit issues the warning at least by one means of light, sound, and vibration.

4. The image capture device according to claim 1, wherein the warning unit performs wireless communications with the image capture device.

5. The image capture device according to claim 1, wherein the warning unit has a setting not to issue the warning irrespective of the determination result of the control unit.

6. The image capture device according to claim 1, further comprising:
a camera shake correction section that finds, from the motion vectors detected by the motion vector detection unit for all of the images, first and second motion vectors being the first and second largest, determines the second motion vector as a motion caused by camera shake, and applies a camera shake correction based on the successive images and the second motion vector corresponding thereto.

7. An image capture method, comprising the steps of:
capturing a succession of images within a frame of an image capture unit;
calculating a motion vector of an object within a plurality of the successive images captured by the image capture unit;
determining whether the detected motion vector is of at least a predetermined magnitude in a fixed direction;

issuing, during image capturing, a warning to a user, when the calculated motion vector is of at least the predetermined magnitude in the fixed direction, that a frame-out possibility exists; and indicating to the user in which direction to move the frame of the image capture unit so as to prevent the frame-out from occurring;

displaying the successive images in a sequential manner;

designating a specific region of any of the images displayed;

detecting the motion vector for only the designated specific region;

when the specific region is not included in a first image captured by the image capture unit, determining a movement amount of the specific region with respect to the image based on the detected motion vector for a second image immediately before the first image; and displaying a display element indicating a direction and an amount that the specific region is moved from the second image, based on said determined movement amount.

* * * * *